United States Patent [19]

Matsuura et al.

[11] Patent Number: 5,304,227
[45] Date of Patent: Apr. 19, 1994

[54] ELECTRET FILTERS

[75] Inventors: Satoshi Matsuura; Tsuneo Kishiba; Yoshio Shinagawa, all of Kuga, Japan

[73] Assignee: Mitsui Petrochemical Industries, Ltd., Tokyo, Japan

[21] Appl. No.: 53,517

[22] Filed: Apr. 28, 1993

Related U.S. Application Data

[63] Continuation of Ser. No. 798,743, Nov. 27, 1991, abandoned.

[30] Foreign Application Priority Data

Nov. 30, 1990 [JP] Japan .................. 2-334302

[51] Int. Cl.$^5$ .................................. B01D 39/04
[52] U.S. Cl. .................................. 55/524; 55/528; 55/DIG. 5; 55/DIG. 39
[58] Field of Search .................. 55/524, 528, DIG. 39, 55/DIG. 5

[56] References Cited

U.S. PATENT DOCUMENTS

| Re. 31,285 | 6/1983 | van Turnhout et al. | 55/DIG. 39 |
|---|---|---|---|
| 3,307,332 | 3/1967 | Grace et al. | 55/528 X |
| 3,507,708 | 4/1970 | Vignaud | 55/524 X |
| 3,520,416 | 7/1970 | Keedwell | 55/524 X |
| 3,631,654 | 1/1972 | Riely et al. | 55/524 X |
| 3,644,605 | 2/1972 | Sessler et al. | 55/DIG. 39 |
| 3,675,391 | 7/1972 | Gallacher | 55/524 X |
| 3,803,810 | 4/1974 | Rosenberg | 55/524 X |
| 4,017,282 | 4/1977 | Zahka et al. | 55/524 X |
| 4,126,141 | 11/1978 | Grossman | 55/528 X |
| 4,181,514 | 1/1980 | Lefkowitz et al. | 55/528 X |
| 4,361,619 | 11/1982 | Forsten et al. | 55/528 X |
| 4,540,625 | 9/1985 | Sherwood | 55/528 X |
| 4,626,263 | 12/1986 | Inoue et al. | 55/DIG. 39 |
| 4,657,639 | 4/1987 | Mahadevan et al. | 55/DIG. 39 |
| 4,749,348 | 6/1988 | Klaase et al. | 55/DIG. 39 |
| 4,753,730 | 6/1988 | Maurer | 55/524 X |
| 4,874,399 | 10/1989 | Reed et al. | 55/DIG. 39 |
| 4,874,659 | 10/1989 | Ando et al. | 55/DIG. 39 |
| 4,917,942 | 4/1990 | Winters | 55/DIG. 39 |

FOREIGN PATENT DOCUMENTS

| 0325854 | 2/1989 | European Pat. Off. | |
| 56-010313 | 2/1981 | Japan | 55/DIG. 39 |
| 56-010314 | 2/1981 | Japan | 55/DIG. 39 |
| 2060259 | 4/1981 | United Kingdom | 55/DIG. 39 |

OTHER PUBLICATIONS

Applied Physics Letter, vol. 52, No. 18, May 2, 1988, pp. 1540–1541, "Applications of polymer electrets for pollution studies".

Primary Examiner—Robert Spitzer
Attorney, Agent, or Firm—Sherman and Shalloway

[57] ABSTRACT

An electret filter made of a resin whose angle of contact upon wetting with pure water is no smaller than 95 degrees, as well as an electret filter made of a resin whose angle of contact upon wetting with pure water has been adjusted to no smaller than 95 degrees by addition of silicone oil. Those electret filters have high trapping efficiency and their ability to trap particulates, especially cigarette smoke, will not deteriorate even if they are continuously used. Therefore, they can advantageously be used as filter media in many applications such as home and industrial air conditioners, air cleaners, fan heaters, vacuum cleaners, and air conditioning systems for common equipment.

7 Claims, 1 Drawing Sheet

ELECTRET FILTERS

This application is a continuation of application Ser. No. 07/798,743, filed Nov. 27, 1991, now abandoned.

BACKGROUND OF THE INVENTION

This invention relates to electret filters, more particularly, to electret filters that have high trapping capability, with the added advantage that their ability to trap cigarette smoke is retained in a consistent manner.

Electret filters are used as filter media in many applications such as home and industrial air conditioners, air cleaners, vacuum cleaners, fan heaters and air conditioning systems for common equipment to clean ambient atmospheres by trapping the dust, smoke and other particulate contaminants. Such electret filters are conventionally prepared from nonwoven fabrics of polymers such as polypropylene by processing them into electrets. However, the conventional electret filters have had the problem that they are not highly suitable for adsorbing cigarette smoke since their ability to trap it will drop markedly with the amount of adsorption and cannot be retained in a consistent manner.

SUMMARY OF THE INVENTION

The present invention has been achieved under these circumstances and has as an object providing an electret filter whose ability to trap particulates, especially cigarette smoke, will not deteriorate even if it is continuously used and which hence is capable of retaining the satisfactory trapping performance in a consistent manner. Having this advantage, the electret filter of the present invention is suitable for use as a filter medium in air conditioners, air cleaners and other applications.

Cigarette smoke as suspended matter in air consists of liquid particles. When such liquid smoke particles are deposited on the surface of a filter, they cover the fibrous surfaces of the filter and interfere with the action of electric charges that have been formed on the surface of the filter as a result of processing into an electret. This would probably contribute to a sudden drop in the ability of the electret filter to trap cigarette smoke.

Under the circumstances, the present inventor conducted intensive studies in order to obtain a filter which, unlike the conventional filters, would not experience a sudden drop in its ability to trap cigarette smoke. As a result, the present inventor found that this object could be attained by a filter that was made from those materials whose angle of contact upon wetting with pure water was greater than a certain value.

Hence, the aforementioned object of the present invention can be achieved by an electret filter that is made of a resin whose angle of contact upon wetting with pure water is no smaller than 95 degrees.

The object can also be achieved by an electret filter that is made of a resin whose angle of contact upon wetting with pure water has been adjusted to no smaller than 95 degrees by addition of silicone oil.

In a preferred embodiment, the silicone oil may be added in an amount of 0.05–5 wt %.

DESCRIPTION OF THE PREFERRED EMBODIMENT

Figure 1:
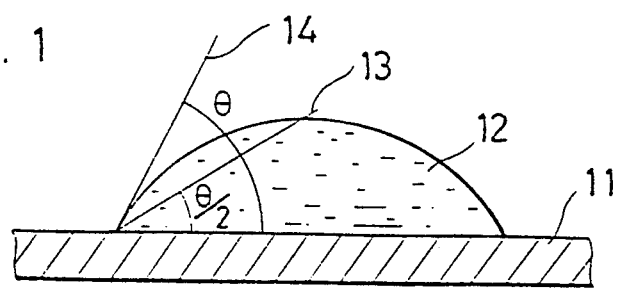
FIG. 1 is a diagram illustrating the liquid droplet method for measuring the angle of contact upon wetting with pure water.

The present invention is described below in detail.

The resins of which the electret filter of the present invention can be made are not limited to any particular types as long as their angle of contact upon wetting with pure water is no smaller than 95 degrees, preferably in the range of 100–110 degrees. They include, but are not limited to, poly-4-methyl-1-pentene, polytetrafluoroethylene (PTFE), fluoroethylene-propylene copolymer (FEP) and perfluoroalkoxy fluorine resins (PFA), as well as modified products of those resins, as modified with unsaturated carboxylic acids (e.g. maleic anhydride), unsaturated epoxy compounds, as well as organosilicon or organofluorine compounds having olefinically unsaturated bonds. Those resins may optionally contain other resins, additives, etc. Examples of such optional resins include polycarbonate resins, polyamide based resins, polyester based resins and polyacrylic resins. Exemplary additives include heat stabilizers, weathering agents, anti-blocking agents, and inorganic or organic fillers.

Those resins whose angle of contact upon wetting with pure water is less than 95 degrees are not suitable for use as the material of electret filters. Examples of such resins with their angle of contact upon wetting with pure water of less than 95 degrees include homopolyprene, polyethyleneterephthalate, polymethacrylate, polycarbonate, etc. However, even such resins can be effectively used if their angle of contact upon wetting with pure water is adjusted to at least 95 degrees by addition of silicone oil. To this end, silicone is added in an amount of 0.05–5 wt %, preferably in the range of 0.1–1.0 wt %. Examples of useful silicone oil are dimethyl siloxane based silicone oil, methylhydrogen polysiloxane based silicone oil, amino-modified silicone oil, epoxy-modified silicone oil, and carboxy-modified silicone oil. If the addition of silicon oil is less than 0.05 wt %, its intended effect will not be achieved. If the addition of silicone oil exceeds 5 wt %, the film forming property of the blend deteriorates and the production rate of electret filters will decrease drastically.

The voltage to be applied for electrification are variable with such factors as the shape of electrodes and the distance between electrodes. If the inter-electrode distance is 8 mm, a voltage of at least 5 kV, preferably 6–10 kV, may be applied to the specimen.

Charges may be applied in various ways such as, for example, passing the specimen between a pair of electrodes under DC voltage, applying corona discharge or a pulsed high voltage to the surface of the specimen, applying a DC high voltage to both surfaces of the specimen as they are retained by a suitable dielectric material, and applying voltage to the specimen under illumination with light.

The thickness of the electret filter of the present invention may be selected as appropriate for such factors as the intended use and the required trapping performance. Usually, the filter has a thickness that generally ranges from ca. 10 to ca. 300 g/m², preferably from ca. 20 to ca. 150 g/m².

The amount of electric charges to be possessed by the electret filter of the present invention can also be adjusted as appropriate for the intended use and other factors; usually, the filter has electric charges of ca. $10-50 \times 10^{-9}$ C/cm².

The angle of contact, upon wetting with pure water, of the resin from which the electret filter is made can be measured by the liquid droplet method as depicted in FIG. 1; with the aid of an angle plate and a movable cross within an optical mirror, the apex 13 of a droplet of pure water 12 on a resin sheet 11 is determined graphically and the value of $\theta/2$ is read directly; that angle is doubled to determine the contact angle $\theta$ which the resin sheet 11 forms with the line 14 which is tangent to the droplet 12.

The following examples are provided for the purpose of further illustrating the present invention but are in no way to be taken as limiting.

EXAMPLE

Example 1

An inflated film of a poly-4-methyl-1-pentene resin (density, 0.833; m.p., 240° C.; melt flow rate as measured by ASTM D 1238, 26 g/10 min; angle of contact upon wetting with pure water, 102°) was used.

The electrificated fibers were cut to a shorter length of 90 mm and made fluffy with an opening card. The fluffy fibers were supplied into a web forming machine and shaped into a web. The web was then needle-punched with a machine of Feller, Inc. to prepare an electret filter sample (30×30 cm) having an aerial density of 100 g/m² and a thickness of 2 mm.

This filter sample was subjected to cigarette smoke adsorption test in the manner described below and, after adsorbing the smoke of 10 or 20 cigarettes, the percent retention of the smoke trapping efficiency was determined. The results are shown in Table 1.

Cigarette Smoke Adsorption Test

Figure 2:
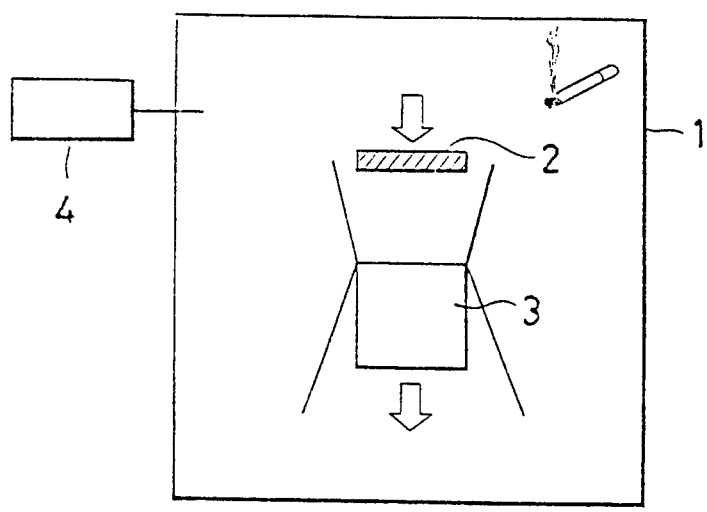
FIG. 2 is a diagram showing schematically the apparatus used to test the cigarette smoke adsorbing capability of the filter samples prepared in Examples 1–15 and Comparative Examples 1–5.

The test apparatus had the layout shown in FIG. 2; it consisted of a box 1 (capacity: 1 m³) containing an aspirator 3 fitted with a filter sample 2 (150 mm×150 mm). A predetermined number of cigarettes was puffed within the box 1 to fill it with the cigarette smoke. At the same time, the aspirator 3 was activated so as to trap the cigarette smoke with the filter sample 2 at an aerial velocity of 0.5 m/sec until the dust density in the box 1 increased to 0.1 mg/m³ as measured with a digital dust meter 4 (P5H of Sibata Scientific Technology, Ltd.) The trapping efficiency of the filter sample 2 was measured by the following method both before and after the adsorption of cigarette smoke, and the percent retention of the trapping efficiency was calculated as $E_1/E_0 \times 100$ (%), where $E_0$ is the efficiency before the adsorption and $E_1$ is the efficiency after the adsorption.

Measuring The Trapping Efficiency

Figure 3:
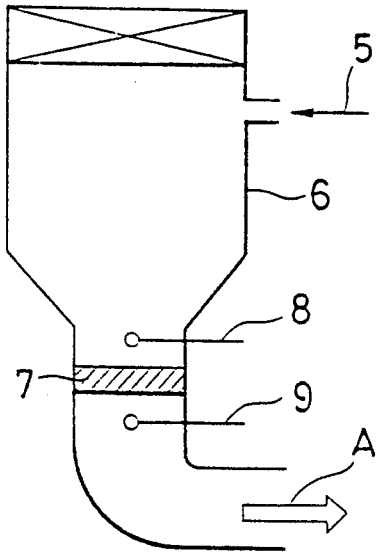
FIG. 3 is a diagram showing schematically the apparatus used to measure the trapping efficiency of those filter samples.

The basic layout of the apparatus for measurement is shown in FIG. 3. Sodium chloride (NaCl) particles (size: 0.3 μm) 5 as produced with an aerosol generator (Nihon Kagaku-Kogyo K.K., not shown) were supplied into a chamber 6 with clean air being used as a carrier. When the concentration of NaCl in the chamber 6 leveled off at $2-6 \times 10^6$/cm³, vacuum was drawn by means of an aspirator (not shown) in the direction of arrow A through a filter sample 7 placed on the bottom of the chamber 6. When the velocity of air passing through the filter became constant (v=50 cm/sec), the concentrations of NaCl particles, $C_{IN}$ and $C_{OUT}$, at the positions upstream 8 and downstream 9, respectively, of the filter sample 7 were measured with a particle counter (KC-01B5 of Rion Co., Ltd.) and its trapping efficiency E was calculated by the following formula:

$$E = \left(1 - \frac{C_{OUT}}{C_{IN}}\right) \times 100 \, (\%)$$

Example 2

A filter sample was prepared as in Example 1 except that the poly-4-methyl-1-pentene film was replaced by a fluoroethylene-propylene copolymer (FEP) film (angle of contact upon wetting with pure water: 101°) available in trade name of Neofron FEP Film NF0025 from Daikin Industries, Ltd. The sample was subjected to a cigarette smoke adsorption test and the percent retention of its trapping efficiency was determined. The results are shown in Table 1.

Comparative Examples 1-5

Filter samples were prepared as in Example 1 except that the poly-4-methyl-1-pentene was replaced by homopolypropylene (melt index as measured by ASTM D1238-65T: 0.5), polyethylene terephthalate (PET), polymethyl methacrylate (PMMA), polycarbonate (PC) and composition consisted of polypropylene/maleic anhydride modified polypropylene/polycarbonate (90/5/5 in wt %) and which had the angles of contact upon wetting with pure water listed in Table 1. Those samples were subjected to a cigarette smoke adsorption test and the percent retention of their trapping efficiency was determined as in Example 1. The results are shown in Table 1.

Example 3

| | |
|---|---|
| Polypropylene (MFR by ASTM D 1238: 0.5 g/10 min, density: 0.91 g/cc; homopolypropylene B200 of Mitsui Petrochemical Industries, Ltd.) | 90% |
| Maleic anhydride modified polypropylene (GR-2 of Mitsui Petrochemical Industries, Ltd., not available on the market) | 5% |
| Polycarbonate (Lexan #101 of General Electret Inc.) | 5% |
| Dimethyl siloxane (SH-200 of Toray Silicone Co., Ltd.) | 0.1 part by weight |

A mixture having this formula was fed into a uniaxial extruder (screw dia.: 40 mm), where it was melted, mixed and shaped into pellets. A film produced from the pellets was thereafter processed as in Example 1 to prepare a filter sample.

This filter sample was subjected to a cigarette smoke adsorption test as in Example 1 and the percent retention of its trapping efficiency was determined. The results are shown in Table 1. In comparison with Comparative Example 5, addition of dimethyl siloxane changed up the angle of contact upon wetting with pure water from 89 degrees to 97 degrees, resulting in improvement of the trapping efficiency from 30%, 19% in Comparative Example 5 to 46%, 32% in Example 3.

Example 4

| | |
|---|---|
| Polypropylene (homopolypropylene with ASTM D 1238 MFR of 0.5 g/10 min and a density of 0.91 g/cc) | 90% |
| Maleic anhydride modified polypropylene | 5% |
| Polycarbonate | 5% |
| Dimethyl siloxane (SH-200 of Toray Silicone Co., Ltd.) | 0.3 part by weight |

A filter sample was prepared from a mixture of this formula repeating the procedure of Example 1. The sample was subjected to a cigarette smoke adsorption test as in Example 1 and the percent retention of this trapping efficiency was determined. The results are shown in Table 1.

Example 5

| | |
|---|---|
| Polypropylene (homopolypropylene with ASTM D 1238 MFR of 0.5 g/10 min and a density of 0.91 g/cc) | 90% |
| Maleic anhydride modified polypropylene | 5% |
| Polycarbonate | 5% |
| Dimethyl siloxane (SH-200 of Toray Silicone Co., Ltd.) | 0.5 part by weight |

A filter sample was prepared from a mixture of this formula by repeating the procedure of Example 1. The sample was subjected to a cigarette smoke adsorption test as in Example 1 and the percent retention of its trapping efficiency was determined. The results are shown in Table 1.

Example 6

| | |
|---|---|
| Polypropylene (homopolypropylene with ASTM D 1238 MFR of 0.5 g/10 min and a density of 0.91 g/cc) | 90% |
| Maleic anhydride modified polypropylene | 5% |
| Polycarbonate | 5% |
| Dimethyl siloxane (SH-200 of Toray Silicone Co., Ltd.) | 1.0 part by weight |

A filter sample was prepared from a mixture of this formula by repeating the procedure of Example 1. The sample was subjected to a cigarette smoke adsorption test as in Example 1 and the percent retention of its trapping efficiency was determined. The results are shown in Table 1.

Example 7

| | |
|---|---|
| Polypropylene (homopolypropylene with ASTM D 1238 MFR of 0.5 g/10 min and a density of 0.91 g/cc) | 90% |
| Maleic anhydride modified polypropylene | 5% |
| Polycarbonate | 5% |
| Epoxy-modified silicone oil (SF-8413 of Toray Silicone Co., Ltd.) | 0.1 part by weight |

A filter sample was prepared from a mixture of this formula by repeating the procedure of Example 1. The sample was subjected to a cigarette smoke adsorption test as in Example 1 and the percent retention of its trapping efficiency was determined. The results are shown in Table 1.

Example 8

| | |
|---|---|
| Polypropylene (homopolypropylene with ASTM D 1238 MRF of 0.5 g/10 min and a density of 0.91 g/cc) | 90% |
| Maleic anhydride modified polypropylene | 5% |
| Polycarbonate | 5% |
| Epoxy-modified silicone oil (SF-8413 of Toray Silicone Co., Ltd.) | 0.3 part by weight |

A filter sample was prepared from a mixture of this formula by repeating the procedure of Example 1. The sample was subjected to a cigarette smoke adsorption test as in Example 1 and the percent retention of its trapping efficiency was determined. The results are shown in Table 1.

Example 9

| | |
|---|---|
| Polypropylene (homopolypropylene with ASTM D 1238 MFR of 0.5 g/10 min and a density of 0.91 g/cc) | 90% |
| Maleic anhydride modified polypropylene | 5% |
| Polycarbonate | 5% |
| Amino-modified silicone oil (SF-8417 of Toray Silicone Co., Ltd.) | 0.1 part by weight |

A filter sample was prepared from a mixture of this formula by repeating the procedure of Example 1. The sample was subjected to a cigarette smoke adsorption test as in Example 1 and the percent retention of its trapping efficiency was determined. The results are shown in Table 1.

Example 10

| | |
|---|---|
| Polypropylene (homopolypropylene with ASTM D 1238 MFR of 0.5 g/10 min and a density of 0.91 g/cc) | 90% |
| Maleic anhydride modified polypropylene | 5% |
| Polycarbonate | 5% |
| Amino-modified silicone oil (SF-8417 of Toray Silicone Co., Ltd.) | 0.3 part by weight |

A filter sample was prepared from a mixture of this formula by repeating the procedure of Example 1. The sample was subjected to a cigarette smoke adsorption test as in Example 1 and the percent retention of its trapping efficiency was determined. The results are shown in Table 1.

Example 11

| | |
|---|---|
| Polypropylene (homopolypropylene with ASTM D 1238 MFR of 0.5 g/10 min and a density of 0.91 g/cc) | 90% |
| Maleic anhydride modified polypropylene | 5% |
| Polycarbonate | 5% |
| Carboxy-modified silicone oil (SF-8418 of Toray Silicone Co., Ltd.) | 0.1 part by weight |

A filter sample was prepared from a mixture of this formula by repeating the procedure of Example 1. The sample was subjected to a cigarette smoke adsorption test as in Example 1 and the percent retention of its trapping efficiency was determined. The results are shown in Table 1.

Example 12

| | |
|---|---|
| Polypropylene (homopolypropylene with ASTM D 1238 MFR of 0.5 g/10 min and a density of 0.91 g/cc) | 90% |
| Maleic anhydride modified polypropylene | 5% |
| Polycarbonate | 5% |
| Carboxy-modified silicone oil (SF-8418 of Toray Silicone Co., Ltd.) | 0.3 part by weight |

A filter sample was prepared from a mixture of this formula by repeating the procedure of Example 1. The sample was subjected to a cigarette smoke adsorption test as in Example 1 and the percent retention of its trapping efficiency was determined. The results are shown in Table 1.

Example 13

| | |
|---|---|
| Polypropylene (homopolypropylene with ASTM D 1238 MFR of 0.5 g/10 min and a density of 0.91 g/cc) | 90% |
| Maleic anhydride modified polypropylene | 5% |
| Polycarbonate | 5% |
| Carboxy-modified silicone oil (SF-8418 of Toray Silicone Co., Ltd.) | 0.5 part by weight |

A filter sample was prepared from a mixture of this formula by repeating the procedure of Example 1. The sample was subjected to a cigarette smoke adsorption test as in Example 1 and the percent retention of its trapping efficiency was determined. The results are shown in Table 1.

Example 14

| | |
|---|---|
| Polypropylene (homopolypropylene with ASTM D 1238 MFR of 0.5 g/10 min and a density of 0.91 g/cc) | 90% |
| Maleic anhydride modified polypropylene | 5% |
| Polycarbonate | 5% |
| Fluorine-modified silicone oil (FS-1265 of Toray Silicone Co., Ltd.) | 0.1 part by weight |

A filter sample was prepared from a mixture of this formula by repeating the procedure of Example 1. The sample was subjected to a cigarette smoke adsorption test as in Example 1 and the percent retention of its trapping efficiency was determined. The results are shown in Table 1.

Example 15

| | |
|---|---|
| Polypropylene (homopolypropylene with ASTM D 1238 MFR of 0.5 g/10 min and a density of 0.91 g/cc) | 90% |
| Maleic anhydride modified polypropylene | 5% |
| Polycarbonate | 5% |
| Fluorine-modified silicone oil (FS-1265 of Toray Silicone Co., Ltd.) | 0.3 part by weight |

A filter sample was prepared from a mixture of this formula by repeating the procedure of Example 1. The sample was subjected to a cigarette smoke adsorption test as in Example 1 and the percent retention of its trapping efficiency was determined. The results are shown in Table 1.

TABLE 1

| Sample No. | Angle of contact upon wetting with pure water, $\theta$ (°) | Retention of trapping efficiency (%) | |
|---|---|---|---|
| | | 10 cigarettes | 20 cigarettes |
| 1 | 102 | 52 | 40 |
| 2 | 101 | 50 | 43 |
| 3 | 97 | 46 | 32 |
| 4 | 99 | 51 | 37 |
| 5 | 103 | 55 | 42 |
| 6 | 103 | 57 | 45 |
| 7 | 95 | 45 | 31 |
| 8 | 97 | 48 | 37 |
| 9 | 96 | 46 | 31 |
| 10 | 99 | 50 | 41 |
| 11 | 96 | 44 | 30 |
| 12 | 100 | 52 | 42 |
| 13 | 102 | 54 | 41 |
| 14 | 96 | 43 | 32 |
| 15 | 101 | 49 | 41 |
| 1* | 88 | 27 | 16 |
| 2* | 71 | 23 | 12 |
| 3* | 66 | 20 | 11 |
| 4* | 83 | 24 | 13 |
| 5* | 89 | 30 | 19 |

*Comparative samples

The electret filter of the present invention has high trapping efficiency and its ability to trap particulates, especially cigarette smoke, will not deteriorate even if it is continuously used. Therefore, it can advantageously be used as a filter medium in many applications such as home and industrial air conditioners, air cleaners, fan heaters, vacuum cleaners, and air conditioning systems for common equipment.

What is claimed is:

1. An electret filter made of a resin composition, said resin composition having an angle of contact upon wetting with pure water of no smaller than 95 degrees, said resin composition comprising
    a resin having an angle of contact upon wetting with pure water of less than 95 degrees, and
    0.05–5 wt % of a silicone oil.

2. The electret filter according to claim 1, wherein said resin having an angle of contact upon wetting with pure water of less than 95 degrees is selected from the group consisting of polypropylene, polyethyleneterephthalate, polymethacrylate and polycarbonate.

3. The electret filter according to claim 1, wherein said silicone oil is present in an amount of 0.1 to 1.0 wt %.

4. The electret filter according to claim 1, wherein said resin having an angle of contact upon wetting with pure water of less than 95 degrees is polypropylene.

5. The electret filter according to claim 4, wherein said resin composition having an angle of contact upon wetting with pure water of no smaller than 95 degrees further comprises polypropylene modified with maleic anhydride.

6. The electret filter according to claim 5, wherein said resin composition having an angle of contact upon wetting with pure water of no smaller than 95 degrees further comprises a polycarbonate.

7. An electret filter prepared by a process comprising the steps of:
    cutting electret fibers to a predetermined size, said electret fibers made of a resin composition, said resin composition having an angle of contact upon wetting with pure water of no smaller than 95 degrees, said resin composition comprising a resin having an angle of contact upon wetting with pure water of less than 95 degrees, and 0.05–5 wt % of a silicone oil;
    contacting said cut electret fibers with an opening card to fluff said cut electret fibers;
    shaping said fluffed electret fibers into a web; and
    needle-punching said web.

* * * * *